United States Patent
Ansari et al.

(10) Patent No.: US 7,366,540 B2
(45) Date of Patent: Apr. 29, 2008

(54) HAND-HELD COMMUNICATION DEVICE AS POINTING DEVICE

(75) Inventors: Mohammed Ansari, San Diego, CA (US); Lovleen Chadha, San Diego, CA (US)

(73) Assignee: Siemens Communications, Inc., Boca Raton, FL (US)

( * ) Notice: Subject to any disclaimer, the term of this patent is extended or adjusted under 35 U.S.C. 154(b) by 301 days.

(21) Appl. No.: 10/925,204

(22) Filed: Aug. 23, 2004

(65) Prior Publication Data

US 2006/0040712 A1 Feb. 23, 2006

(51) Int. Cl.
*H04B 1/38* (2006.01)

(52) U.S. Cl. .............. 455/556.1; 455/566; 347/375.1

(58) Field of Classification Search ............ 455/556.1, 455/556.2, 90.1–90.3, 575.1, 74, 517, 524, 455/552.1, 553.1, 566; 345/163, 157, 158, 345/169, 173; 342/357.11, 357.14, 359, 342/375.1; 398/115, 117; 348/14.02
See application file for complete search history.

(56) References Cited

U.S. PATENT DOCUMENTS

| | | | |
|---|---|---|---|
| D320,197 S | 9/1991 | Weber | D14/114 |
| 5,659,335 A | 8/1997 | Partridge, III | 345/157 |
| 5,706,031 A | 1/1998 | Brendzel et al. | 345/172 |
| 5,847,695 A | 12/1998 | Duncan et al. | 345/163 |
| 5,943,625 A | 8/1999 | Yeom et al. | 455/557 |
| 6,285,354 B1 | 9/2001 | Revis | 345/163 |
| 6,694,391 B2 | 2/2004 | Blood | 710/62 |
| 6,750,848 B1* | 6/2004 | Pryor | 345/168 |
| 6,783,069 B1* | 8/2004 | Hecht et al. | 235/454 |
| 2002/0198030 A1 | 12/2002 | Shima | 455/566 |
| 2003/0040346 A1* | 2/2003 | Fukuda et al. | 455/575 |
| 2005/0179657 A1* | 8/2005 | Russo et al. | 345/163 |
| 2006/0019706 A1* | 1/2006 | Ho et al. | 455/556.2 |
| 2006/0025183 A1* | 2/2006 | Huang et al. | 455/575.3 |

* cited by examiner

*Primary Examiner*—George Eng
*Assistant Examiner*—Sam Bhattacharya (57) ABSTRACT

A hand-held communication device capable of being configured as a pointing device employs a camera assembly for sensing movement of the device with respect to a surface, or movement of a user's finger over the camera assembly, allowing the hand-held communication device to be utilized as a pointing device, such as an optical mouse or a trackball, for controlling functions of a computer system in communication with the hand-held communication device or of the hand-held communication device.

30 Claims, 5 Drawing Sheets

HAND-HELD COMMUNICATION DEVICE AS POINTING DEVICE

BACKGROUND OF THE INVENTION

The present invention relates generally to hand-held communication devices such as mobile telephones, palmtop computers, personal digital assistants (PDA's), or the like, and more particularly, to a hand-held communication device capable of functioning as a hand held pointing device.

Hand-held communication devices, particularly mobile telephones, personal digital assistants (PDA's), and the like, comprise a class of portable electronic devices, whose size enables them to be held in one hand while being operated with the other. Typical hand-held communication devices include a display, which may include a digitizer or touch sensitive overlay for allowing a user to enter information and commands using a stylus or pen, and a keypad for entering alphanumeric text, common commands, selecting menus to be displayed by the display, and the like. Often, such hand-held communication devices include a small digital camera, allowing the user of the device to take digital photographs, which may be stored in the device's memory, the memory of a computer system, or transmitted to others via a communication network.

Many hand-held communication devices support sophisticated software applications such as address book and calendar software, Internet browsers, text messaging, and the like. Such software applications require graphical user interface software employing a cursor or pointer for selection of menu items, entering of commands, and the like. Many hand-held communication devices further support gaming applications for the entertainment of their users. Such gaming applications often employ characters that must be precisely manipulated while playing the game. Controls provided by hand-held communication devices (i.e., the keys of the keypad, the stylus/digitizer, and the like) do not readily allow accurate manipulation of indicia such as a cursor, pointer, or gaming character, since the controls, unlike conventional pointing devices (e.g., a mouse, joystick or trackball), are clumsy to use and do not support true 360 degree movement of the indicia. As a result, users often find software or gaming applications supported by the hand-held devices difficult to use, lessening the utility of the devices to the user.

Many computer systems, particularly portable or laptop computer systems, include a touchpad, a small joystick, and/or dedicated keys for providing the functionality of a mouse. However, it is often desirable to utilize an external mouse with a computer system for reasons including comfort, ease of operation, and increased control of the cursor or pointer. Accordingly, many users carry a mouse along with a laptop computer. However, many of these same users also travel with at least one hand-held communication device, such as a mobile telephone, a PDA, or the like. Thus, it would be advantageous to eliminate the need for an external mouse, instead utilizing a hand-held communication device with a computer system, especially a portable computer system.

SUMMARY OF THE INVENTION

The present invention is directed to a hand-held communication device capable of being configured as a pointing device. The hand-held communication device employs a camera assembly for sensing movement of the hand-held communication device with respect to a surface, or movement of a user's finger with respect to the camera assembly, allowing the communication device to be utilized as a pointing device (e.g. a trackball or an optical mouse) for controlling functions of a computer system in communication with the hand-held communication device, or functions of the hand-held communication device (e.g., controlling movement of a cursor or pointer displayed by a graphical user interface of the computer system or hand-held communication device).

In one specific embodiment, the pointing device employs a camera assembly disposed in the housing of a hand-held communication device, for capturing images of a surface as the housing is moved over the surface. The captured images are processed for tracking the movement of the housing.

In a second specific embodiment, the pointing device employs a camera assembly disposed in the housing of a hand-held communication device, for capturing images of a user's finger as the user's finger is moved over the camera assembly. The captured images are processed for tracking movement of the finger.

It is to be understood that both the foregoing general description and the following detailed description are exemplary and explanatory only and are not necessarily restrictive of the invention claimed. The accompanying drawings, which are incorporated in and constitute a part of the specification, illustrate embodiments of the invention and together with the general description, serve to explain the principles of the invention.

DETAILED DESCRIPTION OF SPECIFIC EMBODIMENTS

Reference will now be made in detail to the presently preferred embodiments of the invention, examples of which are illustrated in the accompanying drawings.

FIGS. 1 through 6 illustrate hand-held communication devices 100 capable of being configured as pointing devices in accordance with exemplary embodiments of the present invention. Each hand-held communication device 100 includes a housing 102 having a camera assembly 104. Preferably, the housing 102 is sized to be held within the hand of a user. In exemplary embodiments, the camera assembly 104 comprises a camera (e.g. a digital camera, a digital video camera, or the like) 106 suitable for capturing images of persons, objects, or the like, near the hand-held communication device 100. The camera assembly 104 is supported in the housing 102.

Figure 1:
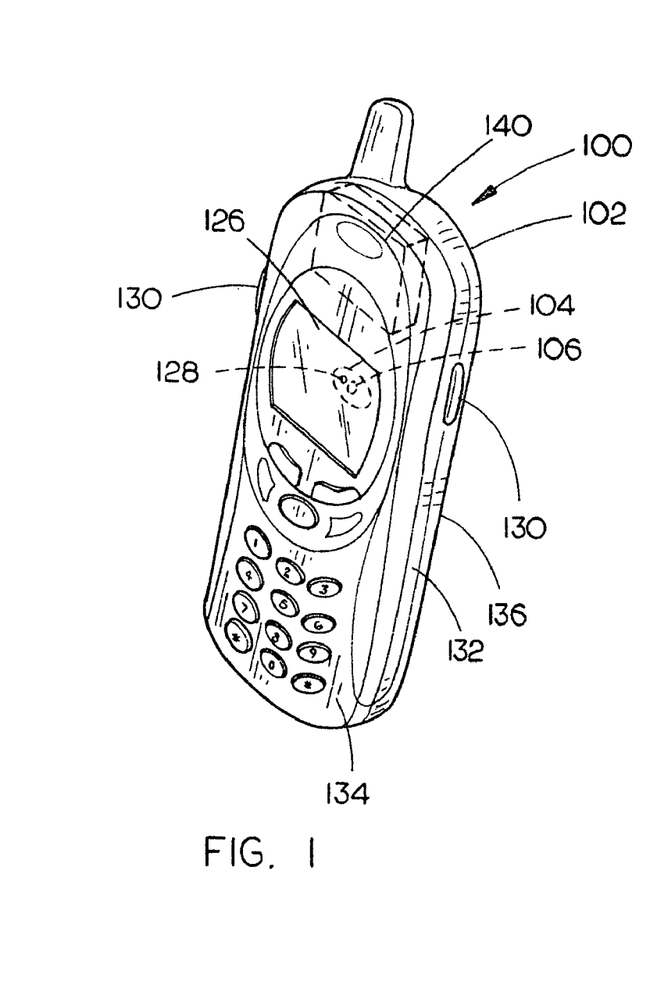
FIG. 1 is an isometric view illustrating a hand-held communication device configured as a pointing device in accordance with an exemplary embodiment of the present invention.
Figure 2:
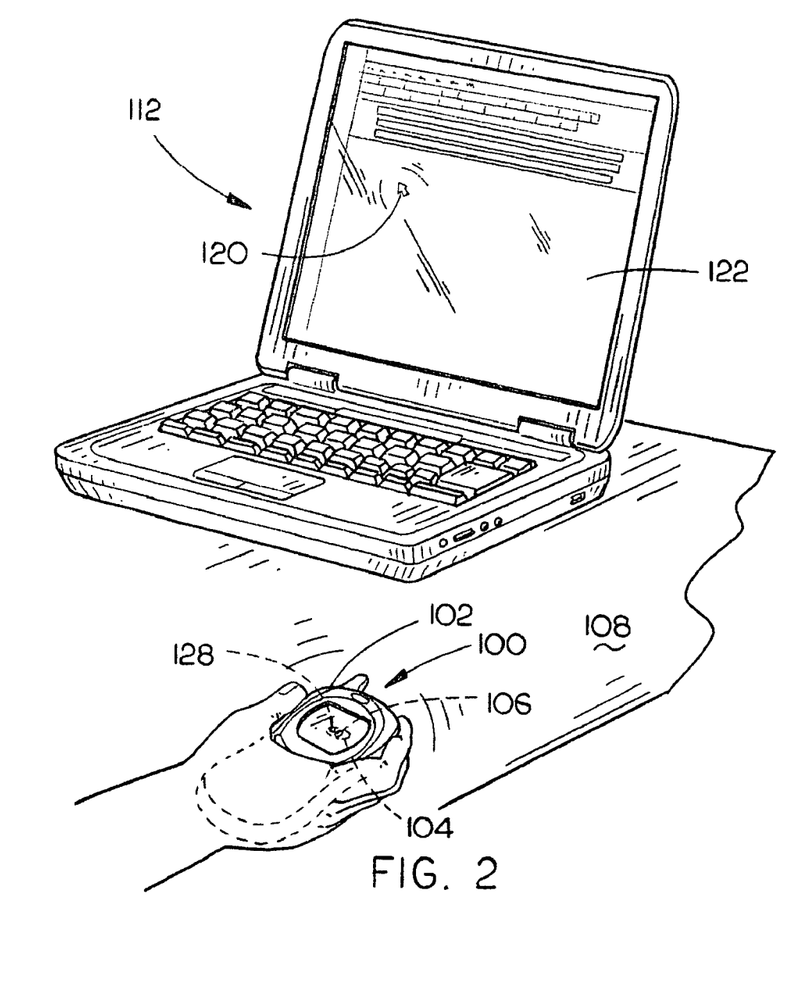
FIG. 2 is an isometric view of the hand-held communication device shown in FIG. 1, illustrating wireless operation of the hand-held communication device as a pointing device.
Figure 3:
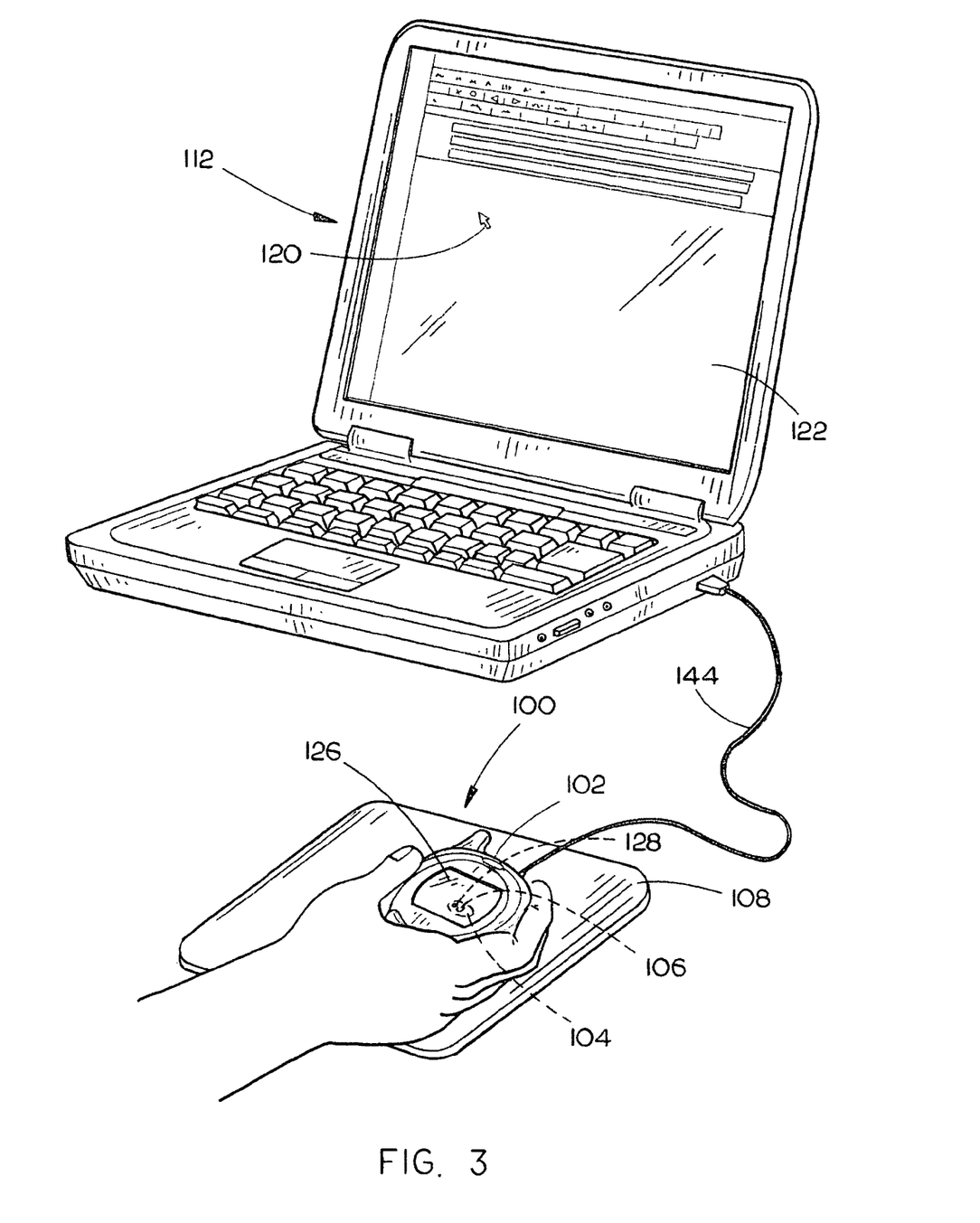
FIG. 3 is an isometric view of the hand-held communication device shown in FIG. 1, illustrating operation of the hand-held communication device as pointing device via a wired connection.

In the embodiment illustrated in FIGS. 1 through 3, the camera 106 of the camera assembly 104 is positioned in the housing 102 for capturing images of a surface 108 such as a desk or table top surface, a mouse pad, or the like, as the housing 102 is moved over the surface 108. The captured images are processed by the processing system of the hand-held communication device 100 for tracking movement of the housing 102 with respect to the surface 108. This tracked movement of the housing 102 over the surface 108 is converted to mouse inputs for software applications supported by a computer system 112 in communication with the hand-held communication device 100, or the hand-held communication device 100 itself. For instance, where the camera 106 comprises a digital camera, digital image processing may be used to process successive images captured by the camera 106. By analyzing movement of the surface 108 across the successive digital images, the movement of the housing 102 with respect to the surface 108 may be converted to mouse inputs (e.g. up-down, left-right, diagonal, or the like). Further, because movement of the housing 102 is continuously variable, analog inputs may be generated by the hand-held communication device 100. It is contemplated that various image processing techniques may be used for identifying the surface 108. The use of such techniques would not depart from the scope and intent of the present invention.

Figure 4:
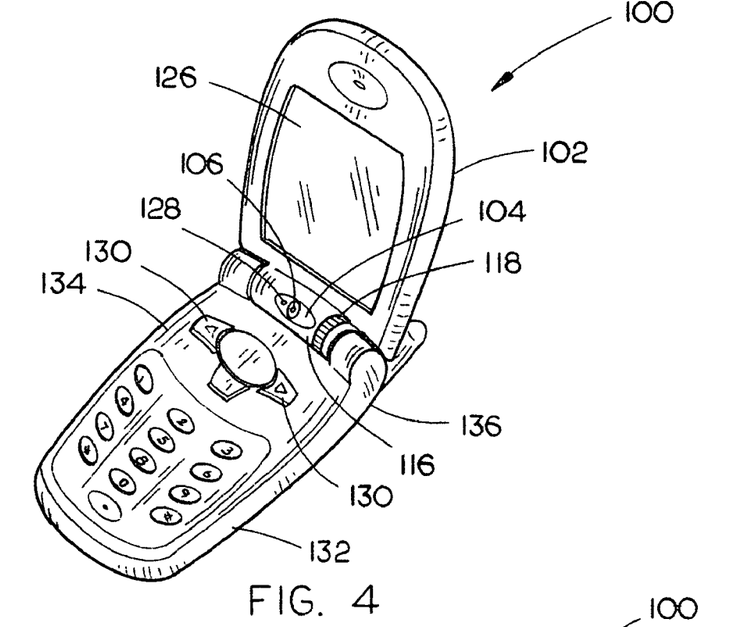
FIG. 4 is an isometric view illustrating a hand-held communication device configured as a pointing device in accordance with a second exemplary embodiment of the present invention.
Figure 5:
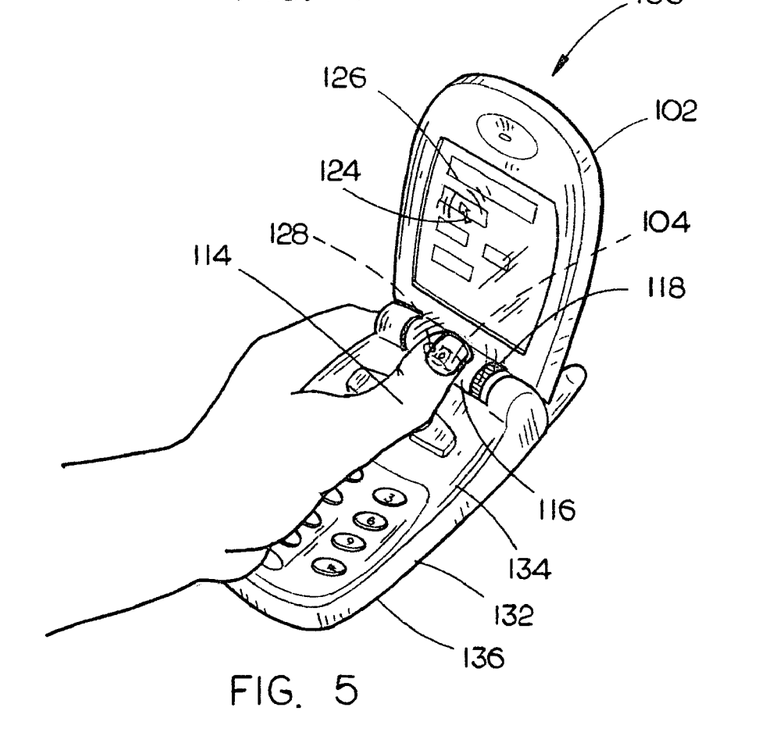
FIG. 5 is an isometric view of the hand-held communication device shown in FIG. 4, illustrating operation of the hand-held communication device as a pointing device.

In the embodiment illustrated in FIGS. 4 and 5, the camera 106 is positioned in the housing 102 for capturing images of a user's finger 114 (e.g., the tip of the user's thumb, index finger, or the like) as the user's finger 114 is moved over the surface (e.g., the lens or lens window) of the camera 106. For example, in the embodiment shown, the camera assembly 104 is supported in the housing 102 by a swivel assembly 116, allowing a user of the hand-held communication device 100 to swivel the camera assembly 104 and position the camera 106 at various angles with respect to the housing 102. In this manner, the user, by rotating or swiveling the swivel assembly 116, may rotate the camera 106 to face the user, or to face away from the user. In exemplary embodiments, the swivel assembly 116 may include a thumb wheel 118 (e.g. a ridged or burled portion) for allowing the user to more easily swivel the camera assembly 104.

The captured images are processed by the processing system of the hand-held communication device 100 for tracking movement of the user's finger 114 over the camera assembly 104. The tracked movement of the user's finger 114 is converted to trackball inputs for software applications supported by the hand-held communication device 100, or by a computer system in communication with the hand-held communication device 100. Thus, as described in the discussion of FIGS. 1 through 3, where the camera 106 comprises a digital camera, digital image processing may be used to process successive images captured by the camera 106. By analyzing movement of the user's finger 114 across the successive digital images, the movement of the user's finger 114 may be converted to trackball inputs (e.g. up-down, left-right, diagonal, or the like). Because movement of the user's finger 114 is continuously variable, analog inputs may be generated by the hand-held communication device 100. Again, it is contemplated that various image processing techniques may be used for identifying the user's finger 114. The use of such techniques would not depart from the scope and intent of the present invention.

Those of skill in the art will appreciate that movement detectable by the camera assembly 104 will be limited by the resolution provided by the camera 106 (e.g. by the digital camera, digital video camera, or the like). Thus, camera assemblies 104 having two or more cameras 106 may be provided if necessary. Additionally, in some embodiments it may be necessary to utilize two or more cameras 106 for sensing two or three-dimensional movements, particularly movement of the camera assembly 104 toward and away from the surface 108, or of the user's finger 114 toward and away from the camera assembly 104. These additional cameras 106 may capture images of the surface 108 or user's finger 114 from various angles for more readily tracking two or three-dimensional movement of the housing 102 with respect to the surface 108 or user's finger 114.

The mouse or trackball inputs generated from the tracked movement of the housing 102 with respect to the surface 108 or user's finger 114 with respect to the camera assembly 104 may be used for controlling a function of the computer system 112 (or other device) in communication with the hand-held communication device 100. In this manner, the hand-held communication device 100 may function as a pointing device that may be used in the same manner as a conventional or optical mouse, a track ball assembly, or the like, for controlling information (e.g., cursor or pointer 120) displayed by the display 122 of the computer system 112. The mouse or trackball inputs generated from the tracked movement of the housing 102 with respect to the surface 108 or user's finger 114 with respect to the camera assembly 104 may also be used for controlling a function of the hand-held communication device 100 itself, as shown in FIGS. 4 and 5. For example, the device 100 may use movement of the housing 102 or the user's finger 114 for accurate manipulation of information and/or indicia such as a cursor, pointer, or gaming character 124 displayed by the display 126 of the device 100. Further, in this manner, the hand-held communication device 100 may be used as a controller for remotely controlling devices such as industrial machinery, remote controlled vehicles, robotic machinery, remotely located computer equipment, or the like.

In exemplary embodiments of the invention, the camera assembly 104 may further include a light source, such as a light emitting diode (LED) 128 or the like, for illuminating the user's finger 114 or the surface 108 over which the housing 102 is moved to supply sufficient reflected light for the camera 106 of the camera assembly 104. In other embodiments, a wall of the housing 102 may be formed of a transparent or translucent material for providing light from the keypad or display backlight of the hand-held communication device 100 for illuminating the user's finger 114 or the surface 108.

The hand-held communication device 100 may also include one or more control buttons 130 utilized in cooperation with the movement of the user's finger 114 or the housing 102 for controlling software applications supported by the hand-held communication device 100 or by the computer system 112 in communication with the hand-held communication device 100. For example, the control buttons 130 may be utilized as first and second mouse or trackball buttons in conjunction with a software application requiring first and second mouse or trackball button inputs. While those of skill in the art will appreciate that any accessible button of the hand-held communication device 100 may be utilized as a control button 130, it may be preferable to use soft keys, or the like, disposed on a side surface 132 of the housing 102 joining the front surface 134 (including the display 126) and the rear surface 136 (including the camera assembly 104).

The hand-held communication devices 100 may, in exemplary embodiments, comprise a mobile telephone, and may further include components for providing wireless communication of voice and/or data information with external sources such as a base station, a cellular communication system tower, a second mobile communication device, or the like. For example, the mobile communication device 100 may comprise internal components 140 including a processing system, memory, a transceiver assembly including a transmitter and receiver or transceiver, an antenna, a data card reader for receiving a data card (e.g., a subscriber identification module (SIM) card or a user identification module (UIM) card), a speaker or earpiece assembly, a microphone, a power source such as a battery, and the like. Additionally, it is contemplated that the mobile communication device 100 may provide functions other than telephony. For example, the mobile communication device may provide functions common to hand held computers or personal digital assistants, portable gaming devices, or the like. In such embodiments, the mobile communication device may further include a suitable processing system, extended memory, a touch screen overlaying display 126 for tactile input of data, or the like.

Figure 6:
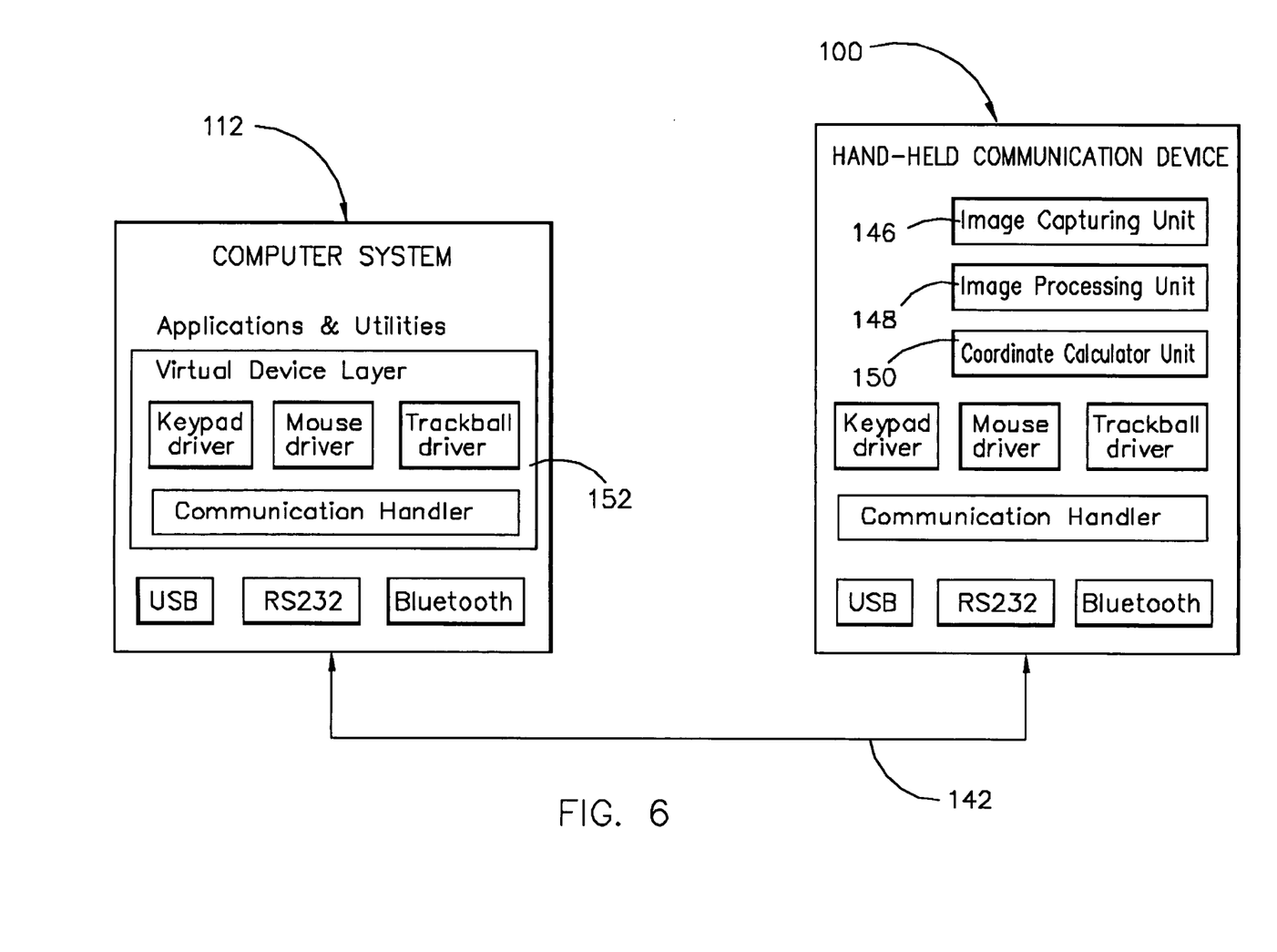
FIG. 6 is a block diagram illustrating a hand-held communication device and a computer system in communication with the hand-held communication device, wherein the hand-held communication device is used as a pointing device in accordance with exemplary embodiments of the present invention.

As shown in FIG. 6, the hand-held communication device 100 communicates with the computer system 112 via a communication link 142, which may include a serial connection (e.g., an RS 232 connection) or USB connection for wired communication (e.g., via cable 144, see FIG. 3), a Bluetooth or WirelessUSB connection for wireless communication, or the like. Those of ordinary skill in the art will appreciate that other communication mechanisms may be supported as well. In embodiments, data captured by the image capturing unit 146 from images taken by the camera assembly 104 (e.g. successive images) is communicated to an image processing unit 148 for removing noise and extracting patterns therefrom. The resulting data is used for calculating coordinates and/or specifying directions (by a coordinate calculator unit 150), which are then communicated with a keypad driver, a mouse driver, a trackball driver, or the like in the hand-held communication device 100. These coordinates/directions are then transmitted via the communication link 142 to the computer system 112 using the desired communication mechanism (e.g., the serial connection, the USB connection, the Bluetooth connection, the WirelessUSB connection, or the like. In exemplary embodiments, the computer system 112 employs a virtual device layer, or the like, 152 to supply the coordinates/directions from the hand-held communication device 100 to a software application supported by the computer system 112.

Figure 7:
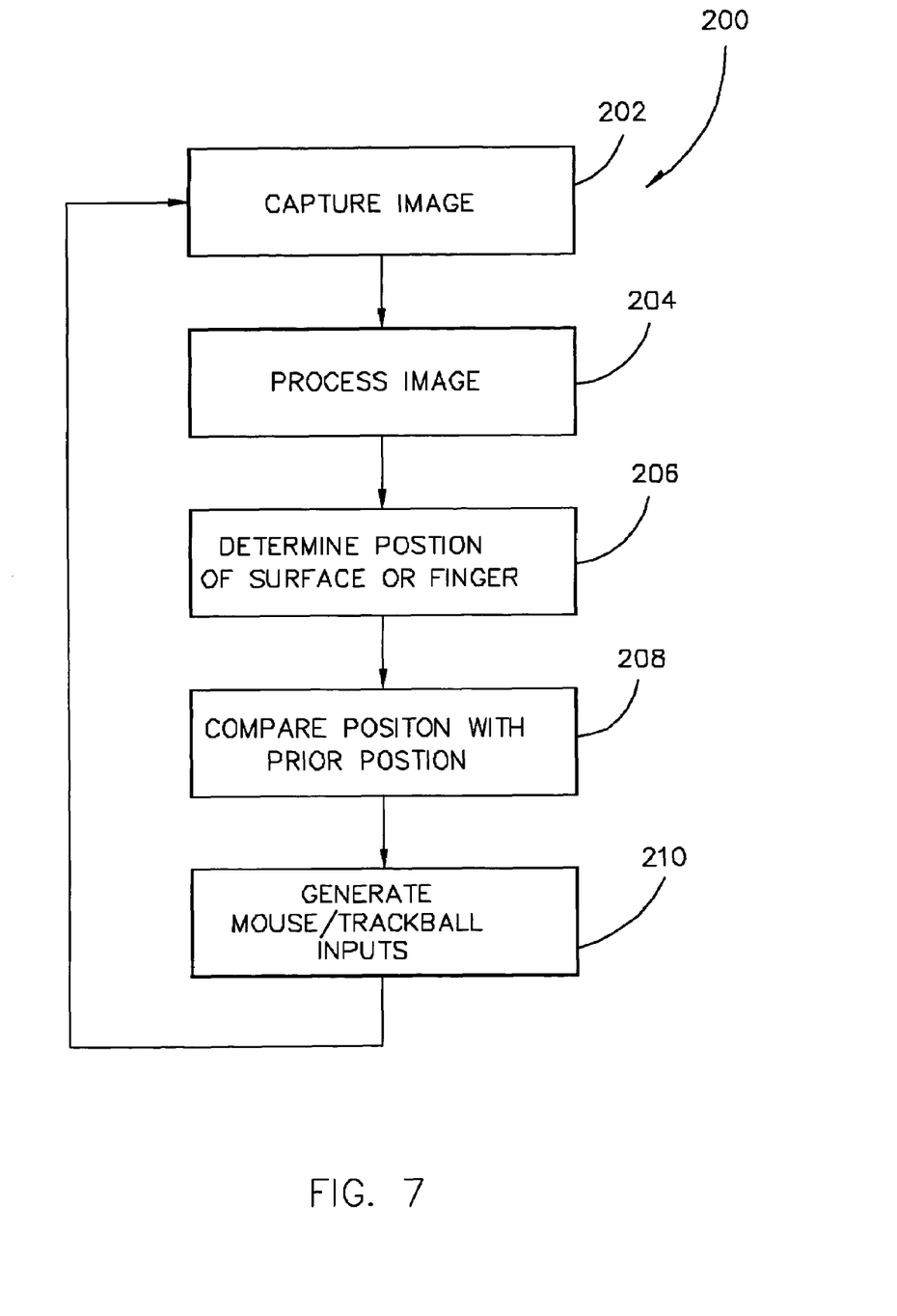
FIG. 7 is a flow diagram illustrating a method for using a hand-held communication device as a pointing device in accordance with an exemplary embodiment of the present invention.

Referring to FIG. 7, a method 200 for using a hand-held communication device having a camera assembly as a pointing device for a computer system is described. An image captured by the camera assembly is captured or received, at step 202. Using noise filtering, extraneous data and/or noise is removed from the image, at step 204. Then, at step 206, a position for the surface over which the hand-held communication device is being moved with respect to the housing of the device or the position of the user's finger with respect to the camera assembly is determined. In exemplary embodiments, this determination may be made using pattern/feature extraction (e.g. pattern recognition) techniques. The determined position of the surface or user's finger is next compared with a previous position (derived from a previous image or a stored image), at step 208, and mouse or trackball inputs are generated for transfer to a computer system in communication with the hand-held communication device, or to an application running on the hand-held communication device, at step 210. Alternatively, in step 206, the image from the image capture device is compared to a previous image or pattern, e.g. a stored image or pattern of the finger in a neutral position using pattern/feature extraction. By comparing the two images, in step 208, a difference in position for the surface or the user's finger between the current and previous images may be determined and used to generate mouse or trackball inputs and/or coordinates for transfer to an application supported by a computer system in communication (wired or wireless) with the hand-held communication device, or an application running on the hand-held communication device. The method 200 is repeated until the hand-held communication device is no longer used as a pointing device (e.g., as long as the hand-held communication device is moved over the surface, or the user's finger is moved over the camera assembly). For example, the method 200 may be repeated multiple times a second in order to provide sensitivity to movement at least substantially similar to that of a conventional optical mouse or trackball assembly.

In exemplary embodiments, the method 200 may be implemented as sets of instructions or software readable by the processing system of the hand-held communication device such as the hand-held communication devices 100 illustrated in FIGS. 1 through 6. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the present invention. The accompanying method claims present elements of the various steps in a sample order, and are not necessarily meant to be limited to the specific order or hierarchy presented.

In FIGS. 1 through 5, the hand-held communication devices 100 illustrated are generally shown in "brick" form with most ornate features eliminated. However, those of ordinary skill in the art will recognize that mobile communication devices 100 in accordance with the present invention are not limited to the specific configurations disclosed herein, but instead may employ form factors having other ornamental or functional design features without departing from the scope and intent of the present invention. For example, FIGS. 1 through 3 illustrate the mobile communication device 100 embodied as a mobile telephone having a unitary housing 102, while FIGS. 4 and 5 illustrate the mobile communication device 100 embodied as a folding mobile telephone or "flip-phone" having a clam-shell housing 102 wherein the camera assembly comprises a camera 106 mounted within a swivel assembly 116 in the clam-shell hinge. However, it is contemplated that the present invention may be implemented in other types of hand-held communication devices 100, including, but not limited to, mobile telephones having forms other than those specifically illustrated (e.g., mobile telephones having two-piece housings that slide with respect to one another), Personal Digital Assistants (PDA's), hand-held gaming devices, and the like. Moreover, placement of the camera assembly is not limited to the rear surface 136 of the housing 102, as illustrated in FIGS. 1 through 3; or to the swivel assembly 116 as illustrated in FIGS. 4 and 5. For example, the camera assembly 104 may be located elsewhere within the housing 102 or provided as an attachment coupled with the hand-held communication device 100 (e.g., as a clip-on assembly, or the like).

It is believed that the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A hand-held communication device, comprising:
   a housing sized to be held within the hand of a user, said housing including a swivel assembly;
   a transceiver assembly contained within the housing for communicating information with a wireless communication system; and
   a camera assembly disposed on said swivel assembly for capturing images, said swivel assembly and said camera assembly being disposed within said housing, said swivel assembly allowing rotation of said camera assembly with respect to said housing, said swivel assembly further allowing said camera assembly to be placed in at least a first position and a second position, said first position for capturing images of a user's finger, said second position for capturing images of a surface;
   wherein the camera assembly captures images of said user's finger as a tip of the user's finger is moved over a lens window of the camera assembly for tracking movement of the finger when said camera assembly is placed in said first position, said and said camera assembly captures images of said surface as the housing is moved over the surface when said housing is in contact with said surface for tracking the movement of the housing when said camera assembly is placed in said second position, the tracked movement of the finger over the camera assembly and the housing over the surface being used for controlling a function of at least one of the hand-held communication device and a computer system in communication with the hand-held communication device.

2. The hand-held communication device as claimed in claim 1, wherein the camera assembly comprises a light source for illuminating the user's finger or the surface and a camera for capturing the images of the surface.

3. The hand-held communication device as claimed in claim 1, further comprising a display.

4. The hand-held communication device as claimed in claim 1, further comprising a control button disposed in the housing, the control button being used in cooperation with movement of the housing for controlling the function.

5. The hand-held communication device as claimed in claim 4, wherein the control button being disposed in a side surface of the housing.

6. The hand-held communication device as claimed in claim 1, further comprising a processing system disposed within the housing, the processing system for processing images captured by the camera assembly when placed in the second position for tracking movement of the housing over the surface.

7. The hand-held communication device as claimed in claim 1, wherein communication between the hand-held communication device and the computer is wireless.

8. The hand-held communication device as claimed in claim 1, wherein communication between the hand-held communication device and the computer is via a wired connection.

9. A hand-held communication device capable of functioning as a pointing device for a computer system including a display for displaying a graphical user interface, the graphical user interface employing a pointer, comprising:
   a housing sized to be held within the hand of a user, said housing including a swivel assembly;
   a transceiver assembly contained within the housing for communicating information with a wireless communication system; and
   a camera assembly disposed on said swivel assembly for capturing images, said swivel assembly allowing rotation of said camera assembly with respect to said housing and further allowing said camera assembly to be placed in at least a first position and a second position;
   wherein the camera assembly captures images of a user's finger as a tip of the user's finger is moved over a lens window of the camera assembly for tracking movement of the finger when said camera assembly is placed in said first position and captures images of a surface when the housing is moved over the surface when said housing is in contact with said surface for tracking the movement of the housing when said camera assembly is placed in said second position, the tracked movement of the user's finger and the housing over the surface being communicated to the computer system for controlling movement of the pointer.

10. The hand-held communication device as claimed in claim 9, wherein the camera assembly comprises a light source for illuminating the surface and a camera for capturing the images of the surface.

11. The hand-held communication device as claimed in claim 9, further comprising a second display disposed in the housing.

12. The hand-held communication device as claimed in claim 11, wherein the housing further comprises a front surface and a rear surface opposite the front surface, the second display being disposed in the front surface.

13. The hand-held communication device as claimed in claim 12, further comprising a control button disposed in the housing, the control button being used in cooperation with movement of the housing for controlling the function.

14. The hand-held communication device as claimed in claim 13, further comprising a side surface joining the front surface and the rear surface, the control button being disposed in the side surface.

15. The hand-held communication device as claimed in claim 9, further comprising a processing system disposed within the housing, the processing system for processing images captured by the camera assembly when placed in the second position for tracking movement of the housing over the surface.

16. The hand-held communication device as claimed in claim 9, wherein communication between the hand-held communication device and the computer is wireless.

17. The hand-held communication device as claimed in claim 9, wherein communication between the hand-held communication device and the computer is via a wired connection.

18. A computer system, comprising:
a display for displaying a graphical user interface, the graphical user interface employing a pointer;
a processing system for executing a program of instructions, the program of instructions for controlling the pointer based on movement of a hand-held communication device over a surface, the hand-held communication device being in communication with the computer system and including a housing sized to be held within the hand of a user, said housing including a swivel assembly; a transceiver assembly contained within the housing for communicating information with a wireless communication system, and a camera assembly disposed on said swivel assembly for capturing images, said swivel assembly allowing rotation of said camera assembly with respect to said housing, said swivel assembly allowing said camera assembly to be placed in at least a first position and a second position, said first position for capturing images of a user's finger, said second position for capturing images of a surface,
wherein the camera assembly captures images of said user's finger as a tip of the user's finger is moved over a lens window of the camera for tracking movement of the finger when said camera assembly is placed in said first position and said camera assembly captures images of said surface when said housing is in contact with said surface as the housing is moved over the surface for tracking the movement of the housing when said camera assembly is placed in said second position, the tracked movement of the finger over the camera assembly and the housing over the surface being used for controlling a function of the computer system.

19. The computer system as claimed in claim 18, wherein the camera assembly comprises a light source for illuminating the surface and a camera for capturing the images of the surface.

20. The computer system as claimed in claim 18, wherein the hand-held communication device further comprises a second display.

21. The computer system as claimed in claim 20, wherein the housing further comprises a front surface and a rear surface opposite the front surface, the second display being disposed in the front surface.

22. The computer system as claimed in claim 21, further comprising a control button disposed in the housing, the control button being used in cooperation with movement of the housing for controlling the function.

23. The computer system as claimed in claim 22, further comprising a side surface joining the front surface and the rear surface, the control button being disposed in the side surface.

24. The computer system as claimed in claim 18, further comprising a processing system disposed within the housing, the processing system for processing images captured by the camera assembly for tracking movement of the housing over the surface.

25. The computer system as claimed in claim 18, wherein communication between the hand-held communication device and the computer is wireless.

26. The computer system as claimed in claim 18, wherein communication between the hand-held communication device and the computer is via a wired connection.

27. A method for using a hand-held communication device as a pointing device for a computer system including a display for displaying a graphical user interface employing a pointer, the hand held communication device including a housing sized to be held within the hand of a user, said housing including a swivel assembly, a transceiver assembly contained within the housing for communicating information with a wireless communication system, and a camera assembly disposed on said swivel assembly for capturing images, said swivel assembly allowing rotation of said camera assembly with respect to said housing, said swivel assembly allowing said camera assembly to be placed in at least a first position and a second position, said first position for capturing images of a user's finger, said second position for capturing images of a surface, the method comprising:
capturing images of said user's finger as a tip of the user's finger is moved over a lens window of the camera and said surface as the housing is moved over the surface when said housing is in contact with said surface;
tracking the movement of the finger over the camera assembly and the housing over the surface; and
communicating the tracked movement of the finger over the camera assembly and the housing over the surface to the computer system, the tracked movement of the finger over the camera assembly and the housing over the surface being used for controlling a function of the computer system.

28. The method as claimed in claim 27, further comprising illuminating the finger or surface.

29. The method as claimed in claim 27, further comprising receiving an input from a control button disposed in the housing, the input from the control button being used in cooperation with movement of the housing for controlling the function.

30. The method as claimed in claim 27, further comprising processing images captured by the camera assembly for tracking movement of the housing over the surface.

* * * * *